United States Patent [19]

Gross

[11] Patent Number: 4,883,139
[45] Date of Patent: Nov. 28, 1989

[54] WINTER FRONT FOR THE GRILL OF A MOTOR VEHICLE

[75] Inventor: Edward J. Gross, Ile Des Chenes, Canada

[73] Assignee: Sundawn Inc., Manitoba, Canada

[21] Appl. No.: 270,587

[22] Filed: Nov. 14, 1988

[51] Int. Cl.⁴ .............................................. B60K 11/08
[52] U.S. Cl. ............................ 180/68.6; 160/DIG. 1; 165/98
[58] Field of Search ...................... 180/68.6, 68.1, 68.4; 296/91, 77.1; 160/DIG. 1, DIG. 2, DIG. 4, 370.2; 165/98, 99; 293/115; 52/473

[56] References Cited

U.S. PATENT DOCUMENTS

| 1,308,056 | 7/1919 | Eastman | 165/98 |
| 1,787,035 | 12/1930 | Davis | 180/68.6 |
| 2,013,446 | 9/1935 | Reiter | 165/98 |
| 2,109,160 | 2/1938 | Yurkovich | 160/DIG. 2 |
| 2,131,874 | 10/1938 | Griffin | 165/98 |
| 4,236,592 | 12/1980 | Ziegler | 180/68.6 |
| 4,471,991 | 9/1984 | Mathias | 180/68.6 |
| 4,523,657 | 6/1985 | Kooyumjian | 180/68.1 |
| 4,750,549 | 6/1988 | Ziegler et al. | 180/68.6 |
| 4,753,288 | 6/1988 | Harvey | 180/68.6 |

FOREIGN PATENT DOCUMENTS 165451 10/1915 Canada .
957711 11/1974 Canada .
0761331 9/1980 U.S.S.R. .............................. 180/68.6

OTHER PUBLICATIONS

Bowdon Products Inc.

Primary Examiner—David M. Mitchell
Attorney, Agent, or Firm—Adrian D. Battison; Stanley G. Ade; Murray E. Thrift

[57] ABSTRACT

A winter front for the front grill of a motor vehicle comprises a plurality of separate panel elements each formed from a thin substantially rigid sheet of acrylic. Each panel can be separately clipped onto the front grill by a spring clip adhesively attached to the rear face of the panel element. In many arrangements the grill has recesses at openings therethrough with structural members across the recesses at a position recessed from the front face of the grill. The elements are separately inserted into respective ones of the recesses with the clips attaching to the structural elements across the grill. A shallow cut out at one edge of the acrylic sheet allows a key to be inserted behind the element to pull the element out of the recess in the grill for removal. The elements in combination cover effectively the whole of the openings in the grill to prevent air flow through the grill. One or more of the elements can be separately removed. The winter front provides an effective barrier to air flow which is highly attractive and enhances the appearance of the vehicle.

18 Claims, 3 Drawing Sheets

WINTER FRONT FOR THE GRILL OF A MOTOR VEHICLE

BACKGROUND OF THE INVENTION

This invention relates to a winter front for attachment to the front grill of a motor vehicle.

The grill of a vehicle is provided partly for ornamental reasons but also to provide a plurality of apertures through which cooling air flows into the engine compartment.

In cold weather climates it is necessary or generally desirable for efficient running of the engine, during the particularly cold spells, to reduce the amount of air flowing through the grill of the vehicle so as to reduce the cooling effect of the very cold air. Winter fronts for this purpose are well known and their use widespread. In most cases the winter front comprises a fabric sheet which is attached over the grill of the vehicle by suitable clips or other fastening devices. In some cases the winter front comprises merely a single fabric sheet which is either attached or removed as necessary so that either the whole of the grill is covered or the whole of the grill is exposed.

In other cases the fabric cover arrangement is more complicated in that it includes various flaps which can be fastened into a closed position to fully cover the grill or can be folded back and fastened down to expose a part of the grill to release some air into the engine compartment. Devices of this general type are shown in U.S. Pat. Nos. 4,236,52 (Ziegler), 4,523,657 (Kooyumjian) and 4,750,549 (Ziegler).

Devices of this type are generally satisfactory in their operation but are highly utilitarian in appearance and certainly reduce the attractiveness of the vehicle. They are also difficult to adjust and when adjusted leave various portions of fabric which are loose or prone to flapping.

In an entirely unrelated field, U.S. Pat. No. 1,787,035 (Davis) discloses an ornamental protective shield which fits over the radiator of a 1930's type automobile. However this is not in any way related to the problem of winter fronts so as to provide control of air flow and is not in any way intended to interfere with or modify air flow.

SUMMARY OF THE INVENTION

It is one object of the present invention, therefore, to provide an improved winter front for a motor vehicle.

According to a first aspect of the invention, therefore, there is provided in a motor vehicle having a front grill which is a plurality of apertures there through for cooling air to pass into an engine compartment of the vehicle, the provision of a winter front covering the grill to reduce the amount of cooling air flowing therethrough, the winter front comprising a plurality of separate panels each formed of a substantially rigid sheet material and having thereon fastening means engaging a structural element of the grill so as to attach the panel to the grill, the panels being shaped and arranged to cooperate each with the next such that when attached to the grill the panels lie in a substantially common plane without overlapping.

According to a second aspect of the invention, therefore, there is provided in a motor vehicle having a front grill which is a plurality of apertures therethrough for cooling air to pass into an engine compartment of the vehicle, the grill having a front surface and a plurality of recesses in the front surface each defining at least one aperture through the grill and at least one structural element of the grill extending across each respective recess with the structural elements lying in a plane spaced rearwardly of the front surface, the provision of a winter front at least partly covering the grill to reduce the amount of cooling air flowing therethrough, the winter front comprising a plurality of separate panels each formed of a substantially rigid sheet material shaped to fit into a respective one of the recesses and having on a rear surface thereof fastening means engaging said structural element of the respective recess of the grill so as to attach the panel into the recess.

According to a third aspect of the invention, therefore, there is provided a kit of parts for forming a winter front for use with a motor vehicle having a front grill which has a plurality of apertures therethrough for cooling air to pass into an engine compartment of the vehicle, the kit of parts comprising a plurality of separate panels each formed of a substantially rigid sheet material and having thereon fastening means for engaging a structural element of the grill so as to attach the panel on to the grill, the panels being shaped and arranged to cooperate each with the next such that when attached to the grill the panels lie in a substantially common plane without overlapping.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
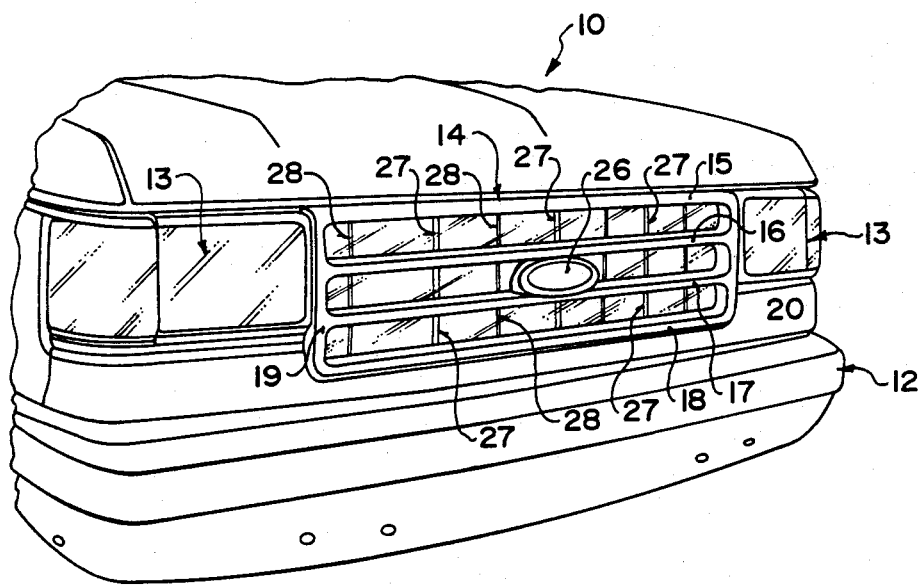
FIG. 1 is a perspective view of the front of a motor vehicle including a grill and a winter front according to the invention.

In FIG. 1 is shown a front portion of a motor vehicle generally indicated at 10 including a hood 11, a front bumper 12, headlamps 13 and a front grill 14 which allows cooling air to enter the engine compartment in conventional manner. The vehicle type shown is a small truck type vehicle and vehicles of this type generally have a relatively large vertical grill filling the area between the headlights. The design of the grill is however only one example and it will be appreciated that other vehicles have different shapes and arrangements of grill for which the principles of the present invention can be adapted.

Small truck type vehicles have a greater requirement for a winter front relative to passenger type automobiles since the grill is relatively large in order to provide a high quantity of cooling air during hot weather and since it is in most cases generally vertical in orientation so that air flow remains large even if the fan is halted when the vehicle is moving due to the relative movement of the air toward the vehicle.

Figure 2:
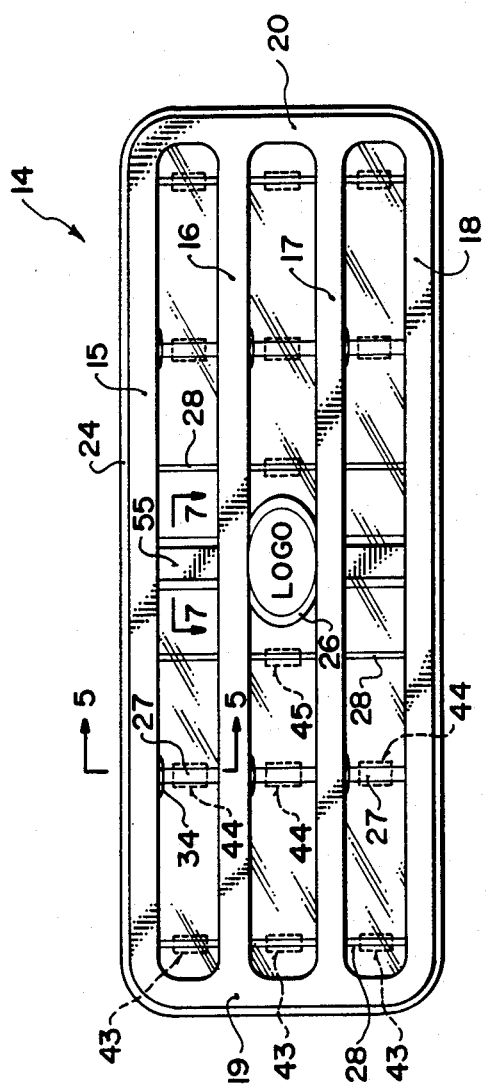
FIG. 2 is a front elevational view of the grill of FIG. 1 showing the winter front in more detail but schematically.
Figure 5:
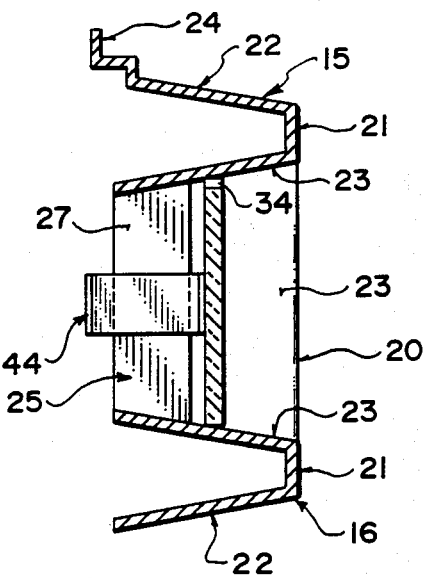
FIG. 5 is a cross sectional view along the lines 5—5 of FIG. 2.

The grill is shown in front elevation in FIG. 2 and is shown partly in cross section in FIG. 5. The grill is formed by four transverse strips 15, 16, 17 and 18 which are connected at ends by vertical strips 19 and 20. All of these strips form a front face of the grill which constitutes the leading surface of the grill. As particularly shown in FIG. 5, each of the strips has a substantially vertical front face 21 and includes rearwardly extending sides 22, 23 which extend from the front face rearwardly and slightly outwardly. As best shown in FIG. 5 the upper side 22 of the strip 15 extends outwardly toward an edge flange 24 which surrounds the whole of the outside of the grill for attachment to the vehicle. The lower side 23 of the strip 15 and also the upper side 23 of the strip 16 extend rearwardly to a position adjacent the vertical plane of the flange 24 at which they terminate in an opening 25 to allow air flow into the vehicle engine compartment.

The horizontal strips 16 and 17 are connected at a centre position therealong by an eliptical boss member 26 which is provided for decorative purposes and to carry the logo of the vehicle manufacturer. In addition the strips 16 and 17 are connected by vertical supports 27 which are positioned approximately one quarter of the distance along the strips and approximately three quarters of the distance along the strips.

Similarly the strips 15 and 16 are connected by vertical supports 27 at the positions one quarter, one half and three quarters along the length of the strips. One of the supports is shown in FIG. 5 and it will be seen that the support is molded integrally with the inner surfaces 23 and extends from a position at the rear of the surfaces 23 to a position partway along the surfaces and generally of the order of one half of the distance therealong thus defining a front face of the support which is recessed from the front face of the grill. For convenience of illustration the supports 27 are omitted from the view of FIG. 2.

The grill thus described is molded generally in one piece from suitable plastics material. Further wire or thin reinforcements 28 are provided intermediate the supports 27 to provide greater structural support and these are recessed from the front face of the grill to a position at or adjacent the rear opening 25.

As stated above the example of grills shown is only one of many types of grill with which the invention can be used. In this particular case the grill include a number of recesses from the front face of the grill by the surfaces 22 and 23 and the front faces of the supports 27. Many grills for different vehicles are of this type, defining recesses since the appearance of the grill is attractive with a possibility of different textures or colors for the front face relative to the recessed structural members.

The winter front shown in FIG. 2 comprises six separate panels or elements each of which is shaped to fit into a recess of the grill. Thus the upper and lower recesses are divided into two separate elements or panels which are connected at a centre line of the grill. The central recess is divided into two separate elements by the central boss member 26.

Each of the separate elements of the winter front is formed of a flat sheet of acrylic material which is preferably transparent or translucent and is preferably smoked or otherwise pigmented to provide a shiny attractive appearance. The thickness of the sheet is such that it has sufficient strength to remain rigid or substantially rigid and self supporting when inserted into a respective one of the recesses.

The acrylic panels are shaped so that when arranged in non-overlapping relationships, in combination they substantially fill the recesses or openings in the grill so as to substantially fill the grill and prevent or reduce the flow of air through the grill into the engine compartment.

Figure 3:
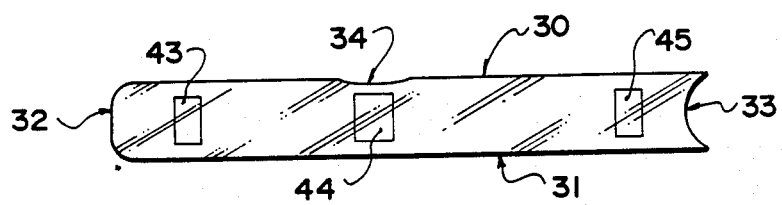
FIG. 3 is an enlarged front elevational view of one element of the winter front.
Figure 4:
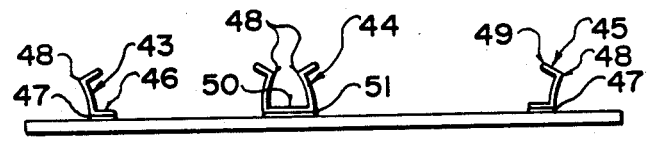
FIG. 4 is a top plan view of the element of FIG. 3.

One of the elements is shown in more detail in FIGS. 3, 4 and 5. In FIGS. 3 and 4 is shown the left hand element of the central recess. This element has a substantially straight upper edge 30, a substantially straight parallel lower edge 31, a convexly curved left hand edge 32 and a concavely curved right hand edge 33 so that it closely follows the shape of the associated recess of the grill. It will be appreciated that the left hand of the element matches the curved inside edge of the vertical strip 19 and the right hand edge 33 closely follows the outer surface of the eliptical boss member 26.

The element consists substantially wholly of the acrylic sheet so that the edges of the acrylic sheet contact directly the inner surfaces of the recesses at generally the surfaces 23 as shown in FIG. 5. The edges of the acrylic sheet thus sit upon and are supported by the sides 23 of the recess. It is not expected that the edges of the element will be in a sealing relationship with the sides 23 since it is not important that sealing takes place but that merely the amount of airflow be reduced.

Figure 6:
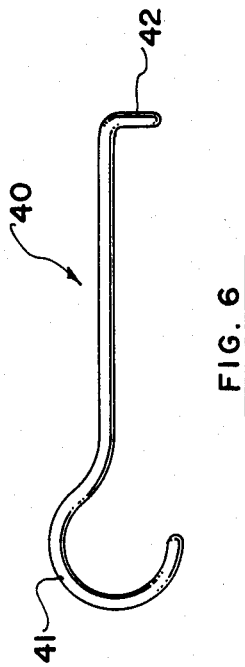
FIG. 6 is a side elevational view of a key for removal of the elements of the winter front from the grill of FIG. 2.

A recess 34 is formed in one edge of the element so that the edge at that recess is spaced slightly further from the side 23 leaving a narrow gap. A key illustrated in FIG. 6 is provided as part of the kit of parts forming the winter front. The key is indicated generally at 40 and includes a manually graspable handle 41 together with a simple turned down operating end 42. The end 42 can thus be inserted through the recess 34 while turned parallel to the side 23 following which the portion 42 can be rotated at right angles to grasp the rear surface of the element to pull the element out of the recess for removal from the grill.

Each of the elements is attached into its respective recess by one or more clip members which engage structural parts of the grill. The element of FIGS. 3 and 4 includes three such clip members indicated respectively at 43, 44 and 45. The clip members 43 and 45 are identical and each comprises a substantially L-shaped member with a base 46 which lies parallel to and is attached to the rear surface of the element by an adhesive 47. Upstanding from the base is a flexible clip portion which extends generally at right angles to the element and defines an apex 48 which engages against or around one of the structural members of the grill. An inclined lead in surface 49 extends from a position remote from the apex gradually toward the apex. The lead in surface 49 thus in operation will engage the structural member so that inward movement of the element toward the structural member causes the clip portion to be flexed outwardly until the apex 48 passes over the structural member and engages around the rear of the structural member to hold the element in place.

Basically the clip 44 comprises two such clip portions connected face to face with the apexes 48 facing inwardly so that they clip around a structural member which has a size so that it can sit in the area between the apexes 48 and be clamped or clipped thereby. In this case the base 50 of the clip portions connects the clip portions to form a U-shape and is again attached to the element by an adhesive layer 51.

The element of FIGS. 3 and 4 as one example, therefore, includes the three separate clips which will hold it in place within the grill. The central clip 44 cooperates with the vertical support 27 so that the clip portions engage around the outer sides of the vertical support 27 with the apexes engaging around the rear most edge of the support 27 as also shown in FIG. 5. The clip members 43 and 45 cooperate with the wires 28 so that they are again deflected by the wire as the element is moved into place and then snapped back behind the wire when the element reaches its intended position within the recess and with the rear surface of the element in contact with or closely adjacent to the front surface of the support 27.

Figure 7:
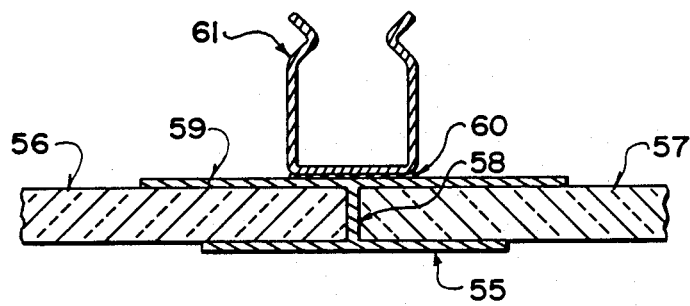
FIG. 7 is a cross sectional view along the lines 7—7 of FIG. 2.

Turning now to FIG. 7, there is shown an edge coupling for joining the two elements which together fill the upper recess. The edge coupling is indicated generally at 55 and connects edges of the elements indicated respectively at 56 and 57. The coupling at 55 is generally H-shape in cross section so that the edges of the elements 56 and 57 can be inserted along the channels defined by the H-shaped to a position close to or abutting the central web 58. A rear plate 59 of the H-shape is adhesive attached at 60 to a further clip 61 of the type previously indicated at 44. The clip 61 thus cooperates with the central vertical support 27 to clip and hold the inner most edges of the elements 56 and 57 in position within the recess. The use of this clip at the central connector 55 obviates the necessity for the inner clip members 45 of the element shown in FIGS. 3 and 4.

Figure 8:
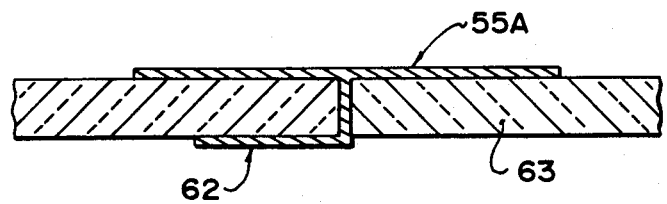
FIG. 8 is a top plan view of a connecting element similar to that shown in FIG. 7 but modified for ready removal of one element.

In FIG. 8 there is shown an alternative style of central coupling element similar to the element 55 but in this case one part of the front plate 62 is omitted so that the element 63 of the winter front is free to be removed from the grill by forward movement away from the coupling 55A without disturbing the coupling 55A.

The winter front thus formed by the kit of parts including the six separate elements can be simply attached to the grill quickly and without the use of tools by snapping the various clips into place with the elements held in place within the recesses of the grill. When the weather is therefore particularly cold, the whole grill can be covered by all of the elements being applied. In a situation where the weather is not so cold that complete blockage is required, one or more of the elements can readily be removed separately from the other elements so that part of the grill is open for the passage of cooling air. The elements are thus entirely independant from one another but together cooperate to cover the whole of the grill or more specifically the whole of the recesses within the grill.

The rigid acrylic material thus provides a winter front which is highly attractive in appearance since it enhances the appearance of the grill by providing a shiny surface recessed within the grill. This provides a compliment to or a contrast against the texture of the front surface of the grill. The winter front can be adjusted with regards to the amount of air flowing through the grill simply by removing one or more pieces of the acrylic material leaving the other pieces intact and in place and retaining their attractive appearance. There is thus no folding of fabric materials or flapping parts which can detract from the appearance of the vehicle or cause damage to the winter front.

While the winter front has been described in the embodiment shown in relation to a grill which has horizontally elongate recesses, it can be used with a grill having recesses which are vertically elongate or which are square or which are of any other shape since the acrylic material can simply be cut to the required shape to be housed within the recess.

In addition the winter front according to the invention can be used with grills which are not so recessed with the acrylic material merely sitting on the outside of the front face of the grill. The clipping methods described herein can be used to attach such outside mounted elements but it may be necessary to increase the length or resilience of the clipping members to ensure that the weight of the element is properly supported. It will be appreciated that in the embodiment described the element is supported within the recess and the clipping forces thus required are relatively low merely to prevent it jumping out of the recess during vibration of the vehicle. In cases where the element is placed on the front face of the grill, it is necessary for the clipping members also to support the vertical weight of the element and hence need to generate greater clipping force. In this case also the winter front is formed by a plurality of separate elements or panels which together cooperate to cover the grill when arranged edge to edge or in a common plane of the grill. The use of the separate elements has a number of advantages. Firstly it enables one or more elements to be readily removed to control air flow. Secondly, it enables the elements to be attached more readily. Thirdly reduces the total mass of each element so that it is less prone to falling from the grill under the vibration forces generated by movement of the vehicle. Fourthly it enables the separate elements to be readily stored when not in use in a suitable box or container of which can be kept on the vehicle.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A motor vehicle having a front grill comprising a front face defined by a plurality of transverse ribs and a plurality of vertical ribs forming therebetween a plurality of apertures through the grill for cooling air to pass into an engine compartment of the vehicle, each of the ribs having a front face defining the front face of the grill, and a plurality of structural elements each associated with a respective one of the apertures and lying in a plane spaced rearwardly of the front face of the grill, and a winter front covering the grill to reduce the amount of cooling air flowing therethrough, the winter front comprising a plurality of separate panels each formed of a plastic sheet material, each panel defining a front surface having a shape to cover at least part of one of said apertures leaving the front face of the ribs exposed, each panel being sufficiently rigid so as to be self supporting across the aperture, each panel having thereon fastening means extending rearwardly therefrom and engaging said structural element of the grill so as to fasten the panel to the grill, the fastening means of each panel being separate from the fastening means of the other panels such that each panel can be separately attached to and removed from the grill.

2. The invention according to claim 1 wherein the panels are shaped and arranged such that they cooperate without overlapping to cover substantially all of the apertures of the grill.

3. The invention according to claim 1 wherein each panel consists of a portion of a plastic sheet material of constant thickness and having a shiny front surface.

4. The invention according to claim 3 wherein the plastic material is transparent.

5. The invention according to claim 1 wherein the fastening means comprises a clip member having a pair of legs extending outwardly from the rear surface of the panel substantially at right angles thereto each of the legs defining a clip face for engaging against said structural element of the grill with the clip faces of the pair being opposed to obtain a clipping action.

6. The invention according to claim 5 wherein the legs are formed as integral elements of a U shaped member with the clip faces directed inwardly and with a connecting base of the U shaped member being attached to the rear surface.

7. The invention according to claim 5 wherein each of the legs is formed as a separate L-shaped member with a base of the L-shape attached to the rear surface.

8. The invention according to claim 1 including a coupling member for connecting an edge of a first panel to an abutting edge of a second panel.

9. The invention according to claim 8 wherein the coupling member is H-shaped in cross section.

10. The invention according to claim 8 wherein the coupling member includes a rear plate portion engaging a rear surface of both the first and second panels, an edge engaging portion extending at right angles to said rear plate portion and a front engaging portion extending therefrom across the front surface of only one of the first and second panels.

11. The invention according to claim 8 wherein said coupling member includes a rearwardly extending leg for engaging in a clipping action against a structural element of the grill.

12. A motor vehicle having a front grill comprising a front face defined by a plurality of transverse ribs and a plurality of vertical ribs forming therebetween a plurality of apertures for cooling air to pass into an engine compartment of the vehicle, each of the ribs having a front face defining the front face of the grill and at least one side face extending rearwardly from the front face and defining a side of the respective aperture and a plurality of structural elements of the grill each associated with a respective one of the apertures and lying in a plane spaced rearwardly of the front face of the grill, and a winter front at least partly covering the grill to reduce the amount of cooling air flowing therethrough, the winter front comprising a plurality of separate panels each formed of a plastic sheet material defining a front surface having a shape to fit into a respective one of the apertures and side edges lying substantially in contact with said side faces of the respective ribs, each panel being sufficiently rigid to be self supporting across the aperture between said side faces and each having fastening means extending rearwardly from the panel and engaging said structural element of the respective aperture of the grill thus attaching the panel into the aperture and leaving said front faces of the ribs exposed, the fastening means of each panel being separate from the fastening means of the other panels such that each panel can be separately attached to and removed from the grill.

13. The invention according to claim 12 including an indentation in said side edge of the panel such that the edge at the indentation is spaced away from said side edge of the rib, and tool means being shaped to extend from a position forwardly of the front surface of the rib through the indentation for engaging a rear surface of the panel for pulling the panel forwardly from the aperture.

14. The invention according to claim 12 wherein each of the panels consists of a single sheet of the material with edges of the sheet engaging sides of the respective aperture.

15. The invention according to claim 14 wherein the front surface of the panel is shiny.

16. The invention according to claim 12 wherein the fastening means comprises a clip member having a pair of legs extending outwardly from the rear surface of the panel substantially at right angles thereto each of the legs defining a clip face for engaging against said structural element of the grill with the clip faces of the pair being opposed to obtain a clipping action.

17. The invention according to claim 12 wherein the legs are formed as integral elements of a U shaped member with the clip faces directed inwardly and with a connecting base of the U shaped member being attached to the rear surface.

18. A motor vehicle having a front grill comprising a front face defined by a plurality of transverse ribs and a plurality of vertical ribs forming therebetween a plurality of apertures for cooling air to pass into an engine compartment of the vehicle, each of the ribs having a front face defining the front face of the grill and at least one side face extending rearwardly from the front face and defining a side of the respective aperture and a plurality of structural elements of the grill each associated with a respective one of the apertures and lying in a plane spaced rearwardly of the front face of the grill, and a winter front at least partly covering the grill to reduce the amount of cooling air flowing therethrough, the winter front comprising a plurality of separate panels each formed of a plastic sheet material defining a front surface having a shape to fit into a respective one of the apertures and side edges lying substantially in contact with said side faces of the respective ribs, each panel being sufficiently rigid to be self supporting across the aperture between said side faces and each having fastening means extending rearwardly from the panel and engaging said structural element of the respective aperture of the grill thus attaching the panel into the aperture and leaving said front faces of the ribs exposed, the fastening means of each panel being separate from the fastening means of the other panels such that each panel can be separately attached to and removed from the grill, wherein there is provided tool means separate from the panels including a handle portion and a tool portion shaped for insertion between said side surface of the rib and said edge of the panel for removal of the panel from the grill.

* * * * *